A. McLEAN.
ROD PACKING AND PROCESS OF MAKING SAME.
APPLICATION FILED AUG. 7, 1912.

1,082,890.  Patented Dec. 30, 1913.

Witnesses.
James E. Sproll.
Arita Adams

Inventor
Archibald McLean
By Adams & Brooks
Attorneys.

UNITED STATES PATENT OFFICE.

ARCHIBALD McLEAN, OF FORT STEILACOOM, WASHINGTON.

ROD-PACKING AND PROCESS OF MAKING SAME.

1,082,890.  Specification of Letters Patent.  Patented Dec. 30, 1913.

Application filed August 7, 1912. Serial No. 713,905.

*To all whom it may concern:*

Be it known that I, ARCHIBALD MCLEAN, a citizen of the United States of America, and a resident of the town of Fort Steilacoom, in the county of Pierce and State of Washington, have invented certain new and useful Improvements in Rod-Packings and Processes of Making Same, of which the following is a specification.

My invention has more particular reference to packing rings for piston rods and the like and it has for its primary object to provide a packing of this character which is of a compressible nature and including a lubricating element.

A further object resides in my improved method for producing the packing.

With these and other objects in view, my invention resides in the features of construction and steps in the method of production, hereinafter described and succinctly defined in my annexed claims.

Figure 1:
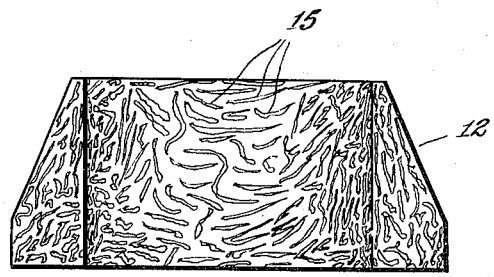

Referring to the accompanying drawing: Figure 1 is an elevation of a packing unit constructed in accordance with my invention, and Fig. 2 is a longitudinal section of a stuffing box equipped with my packing.

My packing comprises metallic fibers or shavings, as 15, which are embedded in a body 12 consisting of a lubricating compound. This body comprises what I term a carrier, preferably consisting of hard grease, and graphite.

In practice, the hard grease is melted and the metallic fibers or shavings dipped into the same. Following this the fibers are removed and then immediately coated with graphite, this being conveniently effected by sprinkling the graphite into the mass of fiber while the grease adhering thereto is in a warm condition. The graphite is therefore held by the grease and the entire mass is now placed in a mold and pressed to form.

Figure 2:
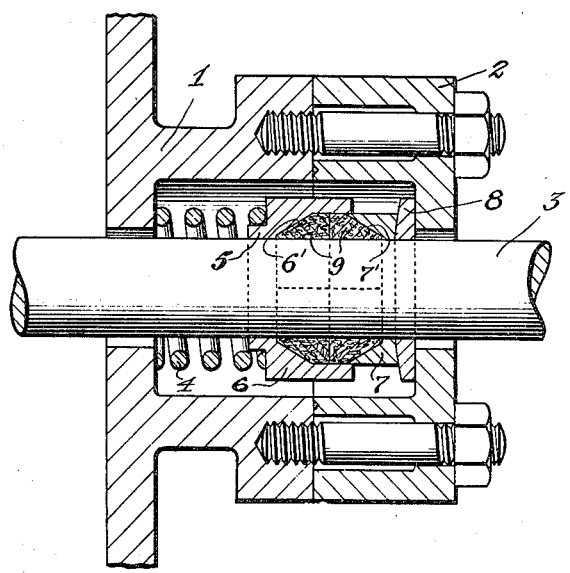

In the construction shown in Fig. 2, I employ a packing ring comprising two units 9 which are mounted in a casing 6, which latter has a removable head 7. This construction forms the subject matter of a separate application executed on even date herewith, and may be briefly described as follows:

Reference numeral 1, designates a stuffing box of ordinary construction, 2 the cap therefor, and 3 the piston or other rod extending therethrough.

Within the stuffing box 1 and bearing against the inner end wall thereof is a spring 4, this encircling stem 3 and being seated on a boss 5 of casing 6.

Casing 6 has its outer end portion formed cylindrical and its inner end portion tapered or substantially conical, as at 6'. Head 7 which operates in casing 6 has a conical seat 7' opposing the tapered casing portion 6'.

Reference numeral 8 indicates a ring seated against the inner face of cap 2 and having its inner face formed convex and engaged in the concave outer face of head 7.

Packing units 9 which abut one another have their other end portions conical in form to have snug fit in the casing parts 6', 7' respectively. By this construction, spring 4 yieldingly presses casing 6 over head 7 as the lubricant element of the packing is taken up by the rod 3.

Metallic fibers or shavings 15 are of a resilient nature and when embedded in the lubricant, will yield during the compression of the packing. They are composed of a composition of antimony and lead, these two metals being first combined in a molten condition and afterward reduced on a lathe to shavings or thin narrow strips.

Having thus described my invention, what I claim as new, and desire to secure by Letters Patent of the United States of America, is:

1. The method of producing packing material, which consists in first placing an initial coating of grease on metallic strands, and afterward applying to the said grease coating, a powdered carbonaceous-like lubricant.

2. A packing composition, comprising metallic strands, an initial coating of hard grease directly covering the individual strands, and a coating of powdered carbonaceous-like material applied to said initial grease coating.

Signed at Fort Steilacoom, Wash., this 29th day of July 1912.

ARCHIBALD McLEAN.

Witnesses:
B. E. COHOON,
R. T. RUSSELL.